United States Patent
Sakai et al.

(10) Patent No.: US 8,966,214 B2
(45) Date of Patent: Feb. 24, 2015

(54) VIRTUAL STORAGE DEVICE, CONTROLLER, AND COMPUTER-READABLE RECORDING MEDIUM HAVING STORED THEREIN A CONTROL PROGRAM

(71) Applicant: Fujitsu Limited, Kawasaki-shi (JP)

(72) Inventors: Motohiro Sakai, Yokohama (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 13/687,615

(22) Filed: Nov. 28, 2012

(65) Prior Publication Data
US 2013/0205111 A1  Aug. 8, 2013

(30) Foreign Application Priority Data

Feb. 2, 2012 (JP) .................................. 2012-020587

(51) Int. Cl.
| G06F 12/00 | (2006.01) |
|---|---|
| G06F 12/06 | (2006.01) |
| G06F 9/50 | (2006.01) |
| G06F 3/06 | (2006.01) |

(52) U.S. Cl.
CPC .......... *G06F 12/0646* (2013.01); *G06F 9/5011* (2013.01); *G06F 3/0665* (2013.01); *G06F 3/0608* (2013.01); *G06F 3/0652* (2013.01); *G06F 3/0689* (2013.01)
USPC ....................................................... 711/170

(58) Field of Classification Search
None
See application file for complete search history.

(56) References Cited

U.S. PATENT DOCUMENTS

| 6,269,464 B1 * | 7/2001 | Boussina et al. ............... 714/752 |
| 6,324,497 B1 * | 11/2001 | Yates et al. ...................... 703/24 |

(Continued)

FOREIGN PATENT DOCUMENTS

| JP | 2009-116809 | 5/2009 |
| JP | 2011-013800 | 1/2011 |

(Continued)

OTHER PUBLICATIONS

Williams, Jim, "Oracle Automatic Storage Management and Thin Reclamation," Mar. 31, 2010, Retrieved from the internet: URL:http//www.oracle.com/technetwork/database/oracle-automatic-storage-management-132797.pdf, retrieved on Jun. 21, 2013, 11 pages.

(Continued)

*Primary Examiner* — Brian Peugh
(74) *Attorney, Agent, or Firm* — Fujitsu Patent Center (57) ABSTRACT

A virtual storage device including a releasable region decider that decides whether each of a plurality of management unit regions is a releasable region, being allocated a physical region and being a release candidate region, by referring to management data that associates allocation data representing a state of allocating a physical region to the management unit region and release candidate region data representing whether the management unit region is a release candidate region with each other; a determinator that determines whether the management unit region decided to be the releasable region by the releasable region decider is an all-zero region all data in which are zero; and a releaser that releases allocation of a physical region allocated to the management unit region determined to be the all-zero region by the determinator. This configuration makes it possible to efficiently use the storage region.

20 Claims, 6 Drawing Sheets

(56) References Cited

U.S. PATENT DOCUMENTS

| | | |
|---|---|---|
| 8,108,644 B2 | 1/2012 | Innan et al. |
| 8,239,648 B2 | 8/2012 | Goebel et al. |
| 8,281,097 B2 | 10/2012 | Wada |
| 2002/0035664 A1* | 3/2002 | Yates et al. .............. 711/111 |
| 2009/0089516 A1 | 4/2009 | Pelts et al. |
| 2011/0191629 A1 | 8/2011 | Daikokuya et al. |
| 2011/0208931 A1 | 8/2011 | Pendharkar et al. |

FOREIGN PATENT DOCUMENTS

| | | |
|---|---|---|
| JP | 2011-76572 | 4/2011 |
| JP | 2011-159241 | 8/2011 |

OTHER PUBLICATIONS

Extended European Search Report dated Oct. 29, 2013 for corresponding European Application No. 12197467.9.

\* cited by examiner

VIRTUAL STORAGE DEVICE, CONTROLLER, AND COMPUTER-READABLE RECORDING MEDIUM HAVING STORED THEREIN A CONTROL PROGRAM

CROSS-REFERENCE TO RELATED APPLICATIONS

This application is based upon and claims the benefit of priority of the prior Japanese Patent Application No. 2012-020587, filed on Feb. 2, 2012, the entire contents of which are incorporated herein by reference.

FIELD

The embodiment discussed herein is directed to a virtual storage device, a controller, and computer-readable recording medium having stored therein a control program.

BACKGROUND

A technique called Redundant Array of Independent Disks (RAID) has been spread to improve the reliability of a storage device. In particular, a storage device using the RAID technique and a thin-provisioning function in combination is adopted in order to reduce the storing region and managing cost in recent years.

A thin-provisioning function is a technique of a storage system that provides a server with the appearance of a capacity more than that of a physical volume. In other words, a thin-provisioning is a function of virtualizing the appearance volume capacity seen from a superordinate device such as a server.

Generally, when a storage capacity is to be increased, restarting of an Operating system (OS) of the superordinate device, which accompanies a halt of service, is needed for recognizing a newly-added Logical Unit Number (LUN) at the superordinate device. Using a thin-provisioning function can make the initial appearance of the size of the LUN seen from the OS more than the physical volume. With this configuration, a physical disk is added to a storage device when the using rate of the LUN increases without stopping the entire system. This makes it possible to increase the capacity of a physical disk without affecting the OS. As the above, the advantage of the thin-provisioning function is excellent in expandability.

In generating a conventional LUN, which does not adopt the thin-provisioning function, a physical disk having a capacity corresponding to the LUN size has to be prepared beforehand. In contrast, the thin-provisioning function starts the operation of the storage device using the least physical disk and adds a physical disk in accordance with rise in the using rate of the LUN, which can operate the storage device at a low cost. At the same time, the using rate of the physical disk can be enhanced.

As the above, the thin-provisioning function is used as a function of dealing with unexpected request of storage expansion (expandability) without halting the service, which is regarded as one of the problems of achieving, for example, a cloud storage system.

Description will now be made in relation to an operation of the thin-provisioning function. Hereinafter, a LUN that is virtualized using the thin-provisioning function is referred to as a thin-provisioning volume (TPV).

Upon receipt of an Input/Output request (I/O) command to a TPV from the superordinate device, the storage device operates as follows.

First of all, if a Read command issued from the superordinate device instructs I/O into and from a region not allocated a physical disk region, the storage device reply to the superordinate device with all-zero data representing an unused region. Conversely, if the Read command instructs I/O into and from a region allocated a physical disk region, the storage device reads the data in the physical region and forwards the read data to the superordinate device.

Next, when the superordinate device completes writing data into the TPV, the storage device allocates a physical disk region necessary for the amount of data written from the superordinate device to the TPV in units of predetermined management units, and then writes the data into the physical disk.

[Patent Literature 1] Japanese Laid-open Patent Publication No. 2011-159241

[Patent Literature 2] Japanese Laid-open Patent Publication No. 2011-13800

In initializing a storage system and restoring backup data from the OS of the superordinate device, a storage system may sometimes write all-zero data into a physical disk region to represent that the physical disk region is unused.

As the above, upon writing all-zero data into a TPV from a superordinate device, a region into which the all-zero data is written is allocated a physical disk region in spite that data is not actually written into the region. This causes a problem of inefficient use of a disk region and also makes it difficult to effectively exert the thin-provisioning function of enhancing the using efficiency of the physical disk and operating the storage system at a low cost.

SUMMARY

According to an aspect of the embodiment, a virtual storage device that provides a superordinate device with a virtual logical volume including a plurality of management unit regions, the virtual storage device includes: a releasable region decider that decides whether each of the plurality of management unit regions is a releasable region, being allocated a physical region and being a release candidate region, by referring to management data that associates allocation data representing a state of allocating a physical region to the management unit region and release candidate region data representing whether the management unit region is a release candidate region with each other; a determinator that determines whether the management unit region decided to be the releasable region by the releasable region decider is an all-zero region all data in which are zero; and a releaser that releases allocation of a physical region allocated to the management unit region determined to be the all-zero region by the determinator.

According to another aspect of the embodiment, a controller includes a releasable region decider that decides whether each of a plurality of management unit regions included in a virtual logical volume is a releasable region, being allocated a physical region and being a release candidate region, by referring to management data that associates allocation data representing a state of allocating a physical region to the management unit region and release candidate region data representing whether the management unit region is a release candidate region with each other; a determinator that determines whether the management unit region decided to be the releasable region by the releasable region decider is the all-zero region all data in which are zero; and a releaser that releases allocation of a physical region allocated to the management unit region determined to be the all-zero region by the determinator.

According to an additional aspect of the embodiment, a computer-readable recording medium has stored therein a control program for causing a computer to execute a process including: deciding whether each of a plurality of management unit regions included in a virtual logical volume is a releasable region, being allocated a physical region and being a release candidate region, by referring to management data that associates allocation data representing a state of allocating a physical region to the management unit region and release candidate region data representing whether the management unit region is a release candidate region with each other; determining whether the management unit region decided to be the releasable region in the deciding is an all-zero region all data in which are zero; and releasing the physical region allocated to the management unit region determined to be an all-zero region in the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, description will now be made in relation to a virtual storage device, a controller, and a controlling program according to a first embodiment with reference to the accompanying drawings. However, it should be noted that the first embodiment to be described below is a mere example and there is no intention to eliminate various modification and application of techniques, which are not referred in this description. In other words, various modification and changes of the first embodiment can be suggested without departing from the sprit of the present invention. The accompanying drawings may include other elements and functions in addition to those illustrated in the drawings.

Figure 1:
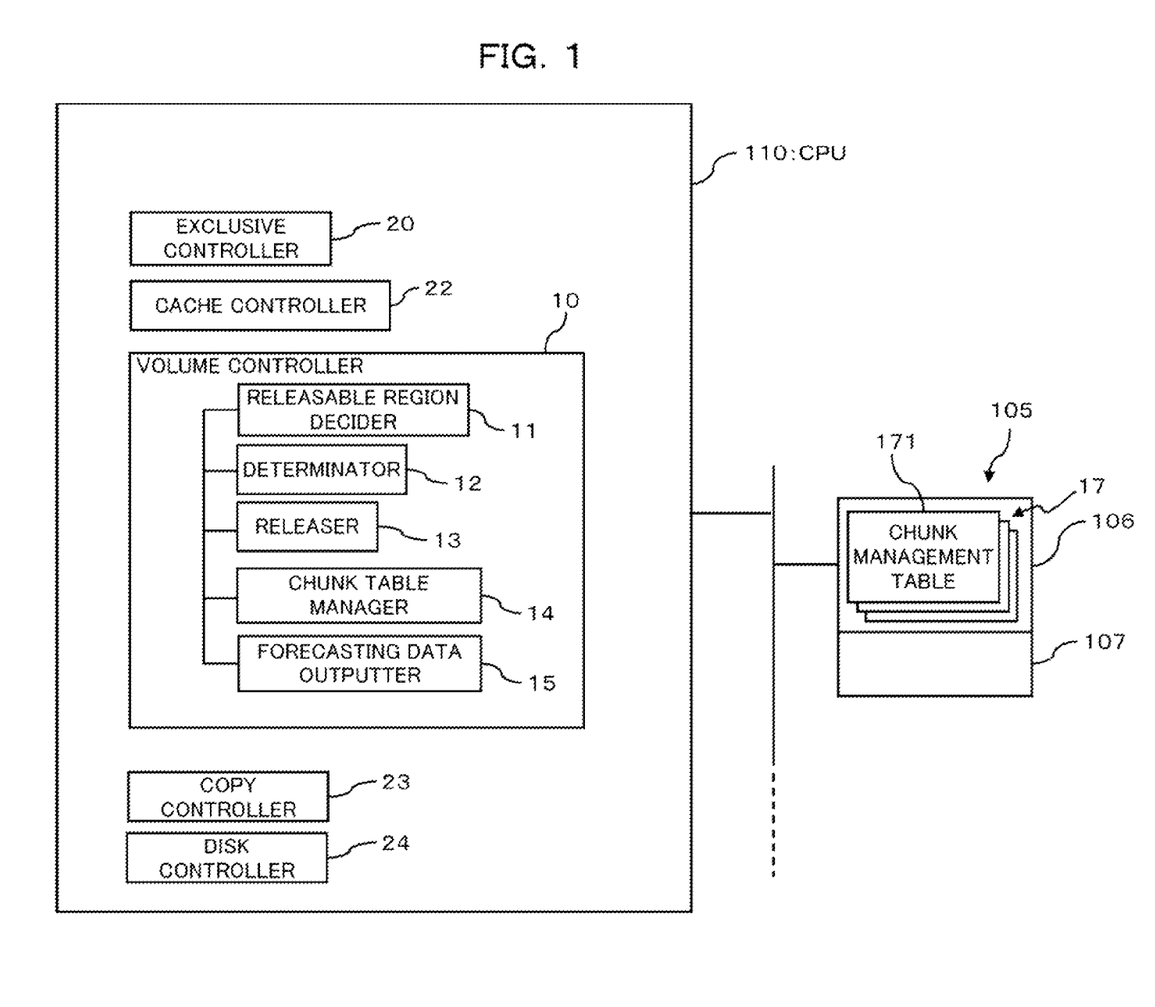
FIG. 1 is a diagram illustrating a functional configuration of a virtual storage device according to a first embodiment.
Figure 2:
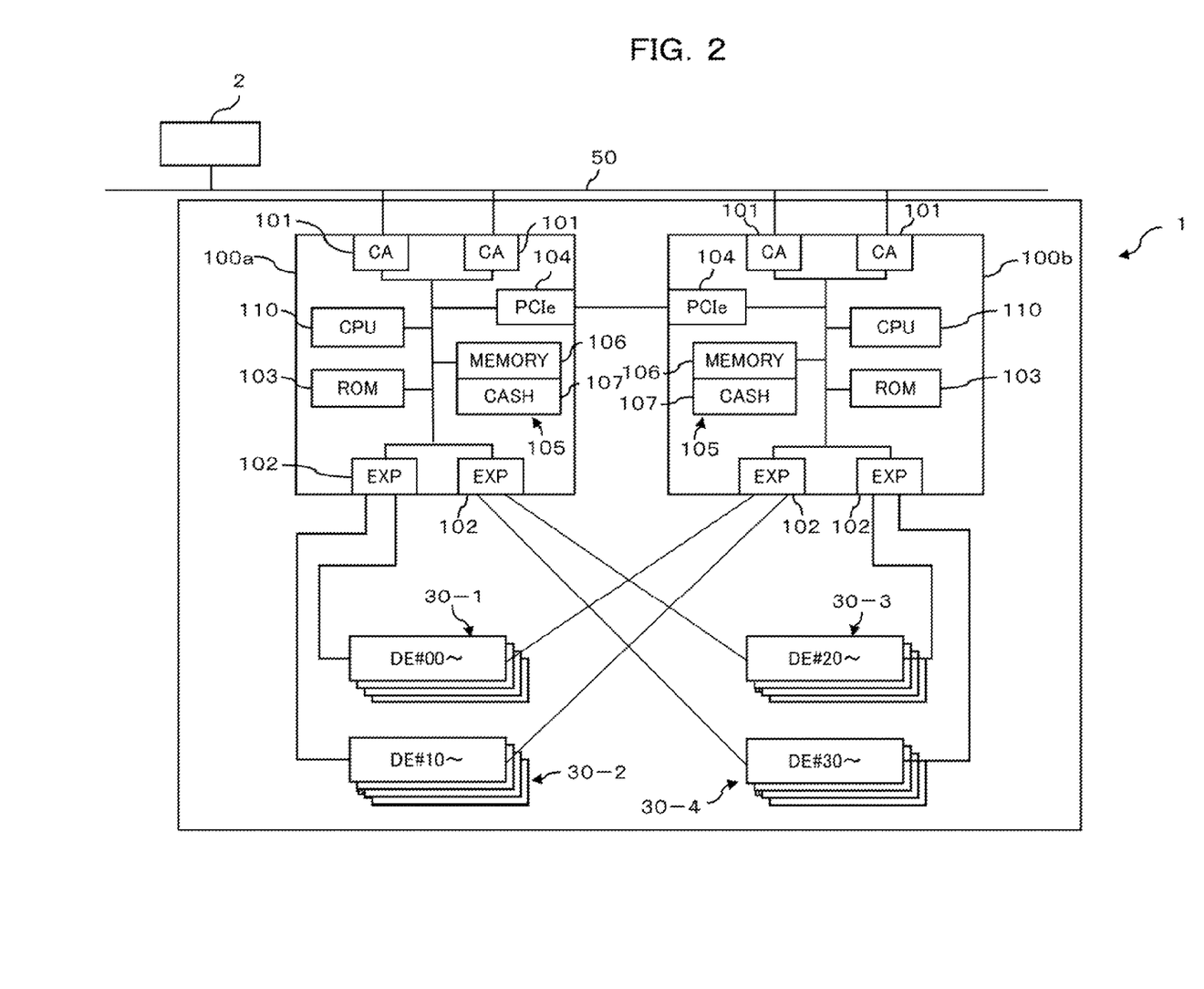
FIG. 2 is a diagram illustrating a hardware configuration of a virtual storage device of the first embodiment.

FIG. 1 is a diagram illustrating the functional configuration of a virtual storage device of the first embodiment; and FIG. 2 is a diagram illustrating the hardware configuration of the first embodiment.

A virtual storage device 1 virtualizes non-illustrated memory devices (a physical storage environment) stored in Disk Enclosures (DEs) 30-1 through 30-4 of FIG. 2 and thereby forms a virtual storage environment. The virtual storage device 1 provides the virtual volume a host computer 2 serving as the superordinate device.

As illustrated in FIG. 2, the virtual storage device 1 is communicably coupled to one or more (one in the example of FIG. 1) host computers 2 through, for example, an iSCSI.

An example of the host computer 2 is an information processor having a function as a server, and transmits and receives various pieces of data, such as SCSI commands and responses, to and from the virtual storage device 1 via a TCP/IP.

The virtual storage device 1 reads and writes data from and into a physical storage associated with a virtual volume in response to an Input/Output request (e.g., read command or write command) from the host computer 2 to the virtual volume. Such an Input/Output request is sometimes referred to as an I/O command.

As illustrated in FIG. 2, the virtual storage device 1 includes multiple (two in the first embodiment) Controller Modules (CMs) 100a and 100b and multiple device enclosures (DEs) 30-1, 30-2, 30-3, and 30-4.

The device enclosures 30-1 through 30-4 are each capable of including one or more memory devices (physical disks, not illustrated). Memory regions (physical volumes) of the memory devices are provided to the virtual storage device 1. For example, the device enclosures 30-1 through 30-4 each include ten slots in which memory devices, such as Hard Disk Drives (HDDs) and Solid State Drives (SSDs), are placed to make it possible to occasionally change the capacity of the physical volume. In the virtual storage device 1, RAID is achieved by arranging multiple memory devices in an array form.

Various types of memory device can be applied. However, the first embodiment assumes that the memory devices to be used are SAS disks coupled in conformity with the standard of Serial Attached SCSI (SAS).

The device enclosures 30-1 through 30-4 are each coupled to one of the two expanders (EXPs) 102 and 102 of the CM 100a and to one of the two expanders 102 and 102 of the CM 100b. This configuration makes each of the CMs 100a and 100b possible to access the device enclosures 30-1 through 30-4 for data writing and data reading. In other words, connecting both CMs 100a and 100b to the device enclosures 30-1 through 30-4 achieves redundant access routes to the memory devices.

Hereinafter, the host computer 2, which is a transmission source of an I/O command, is referred to as the upstream end while the transmission destination of I/O command and a disk access command generated on the basis of an I/O command is referred to as the downstream end in the virtual storage device 1, for convenience.

The device enclosures 30-1 through 30-4 are arranged downstream of the CMs 100a and 100b, and are specifically coupled to the expanders 102 and 102 of the CMs 100a and 100b via data paths such as SAS wide links.

The device enclosures 30-1 through 30-4 have similar configurations. Hereinafter, one of the multiple device enclosures is specified by a reference number 30-1, 30-2, 30-3, or 30-4 whereas an arbitrary device enclosure is represented by a reference number 30.

The CMs 100a and 100b are each a controller that controls various operations in the virtual storage device 1 and specifically carry out various controls such as access controls to the memory devices of the device enclosures 30 in response to I/O commands from the host computer. The CMs 100a and 100b have similar configurations. Hereinafter, one of the CM is specified by a reference number 100*a* or 100*b* whereas an arbitrary CM is represented by a reference number 100.

In the accompanying drawing, elements and parts represented by the same reference number are elements and parts that are the same or the substantially same, so repetitious description will be omitted here.

The CMs 100*a* and 100*b* are connected to a network 50 via respective CAs 101. The CMs 100*a* and 100*b* receive read/write commands from the host computer 2 and control the memory devices via the expanders 102. The CMs 100*a* and 100*b* are coupled to each other via the respective PCIe interfaces 104.

As illustrated in FIG. 2, each CM 100 includes multiple (two in the example of FIG. 2) Channel Adapters (CAs) 101 and 101, multiple (two in the example of FIG. 2) expanders (EXPs) 102 and 102, a Central Processing Unit (CPU) 110, a ROM 103, the PCIe interface 104, and a RAM 105.

Each CA 101 is an interface controller (communication adaptor) that establishes a communicably connection to, for example, the host computer 2. The CA 101 makes possible to couple the corresponding CM 100 to, for example, the host computer 2 via the communication cable 50 to receive an I/O command and to receive and transmit data. In the example of FIG. 2, the CMs 100*a* and 100*b* each include two CAs 101 and 101.

Each CA 101 receives data from the host computer 2 or other device, and transmits data that the corresponding CM 100 outputs to the host computer 2 or other device. Namely, the CA 101 controls data input and output (data I/O) between the corresponding CM and an external device such as the host computer 2.

Furthermore, each CA 101 has a function of Cyclic Redundancy Check (CRC). The CA 101 calculates (generates) a CRC code for to-be-written data (hereinafter sometimes called write data) that is received from the host computer 2 in units of Logical Block Areas (LBAs), and attaches the generated CRC code to the data. In other words, the CA 101 function as a checker that carries out a CRC on write data received from the host computer 2.

The CA 101 can generate such a CRC code in any known method, which will not be detailed here. Examples of the CRC carried out in the first embodiment are CRC-16, CRC-32, and other methods known to public, and the polynomial to be used in CRC is not particularly limited.

The PCIe interface 104 is an interface that achieves communication of the corresponding CM 100 and another CM 100, and transmits and receives data to and from the other CM in conformity with the standard of PCI Express.

Each expander 102 is an interface that communicably connects the corresponding CM 100 to device enclosures 30 and memory devices, and for this purpose, includes a device adapter and others. The expander 102 is connected to memory devices of device enclosures 30 and controls accesses to these memory devices on the basis of I/O commands received from the host computer 2.

Each CM 100 reads and writes data from and into memory devices via the expander 102. In the example of FIG. 2, each of CMs 100*a* and 100*b* includes two expanders 102 and 102, one of which is coupled to the device enclosures 30-1 and 30-2 and the other of which is coupled to the device enclosures 30-3 and 30-4.

With this configuration, both CMs 100*a* and 100*b* can read and write data from and into each device enclosure 30.

The ROM 103 is a memory device that stores programs to be executed by the CPU 110 and various pieces of data.

The RAM 105 is another memory device that temporarily stores various pieces of data and programs, and includes a memory region (Memory) 106 and a cache region (Cache) 107. The cache region 107 temporarily stores data received from the host computer 2 and data to be transmitted to the host computer 2. When the CPU 110 is executing a program, data and the program to be used are temporarily stored and expanded in the memory region 106. Additionally, the memory region 106 includes chunk management tables 171 (chunk management table set 17, see FIG. 1) used by a volume controller 10 that is to be detailed below.

The CPU 110 is a processor that carries out various controls and calculations, and achieves various functions through executing programs stored in the ROM 103. For example, the CPU 110 accomplishes various functions as a typical disk RAID controller, such as, to achieve a RAID and to control access to a memory device in response to a host I/O command from the host computer 2. As illustrated in FIG. 1, the CPU 110 further functions as a exclusive controller 20, a cache controller 22, a copy controller 23, a disk controller 24, and the volume controller 10.

The exclusive controller 20 carries out, when the corresponding CM 100 is coupled to multiple host computers 2, an exclusive control on a write process from the multiple host computers into the memory device of the device enclosure 30.

The disk controller 24 controls data writing into and data reading from memory devices of the device enclosures 30. Specifically, the disk controller 24 writes data read from the cache region 107 into the memory devices, and stores data read from the memory devices into the cache region 107.

The copy controller 23 controls data copying between logical volumes. The copy controller 23 carries out a copy process between volumes in units of blocks each having a predetermined size (e.g. 512-2048 bytes).

The cache controller 22 controls data writing into and data reading from the cache region 107 included in the RAM 105. Specifically, the cache controller 22 writes data read from memory devices and data received from the host computer 2 into the cache region 107, and reads data stored in the cache region 107.

The volume controller 10 provides the host computer 2 with a virtual volume of a thin-provisioning type.

The volume controller 10 regards the memory devices (physical disks) included in the virtual storage device 1 as the storage pool and manages the memory devices. In detail, the memory regions (physical regions) of the physical disks are managed to be a shared disk pool and are allocated depending on the amount of data written into the virtual volume. This eliminates waste of unused physical disks and achieves efficient operation of the RAID system.

The volume controller 10 associates, upon detection of a request from the host computer 2 to write new data into the virtual volume, the new data with a virtual region in the virtual volume. The virtual volume is a virtual memory that is to be accessed from the host computer 2, and is a volume of a thin-provisioning type. Hereinafter, a logical volume virtualized by means of the thin-provisioning function is sometimes referred to as a thin-provisioning volume (TPV). The host computer 2 may be provided with a single virtual volume or may be provided with two or more virtual volumes.

The volume controller 10 provides the host computer 2 with a logical (virtual volume) having a capacity that the host computer 2 requests. However, the volume controller 10 does not initially allocate a physical volume having a capacity assigned to the virtual volume inside the storage, but does allocate a physical volume in units of blocks, called "chunks", having a predetermined logical block size from the volume of the storage pool to the virtual volume on a writing command from the host computer 2. The size (logical block size) of a chunk is generally set in the range of several hundreds kilobytes (KB) to several hundreds megabytes (MB). The first embodiment assumes that the size of a chunk is set to be, for example, 32 MB.

The thin-provisioning function divides the LUN into segments (chunks) each having a predetermined logical block size and manages the LUN by allocating a physical region to each chunk. Immediately after a LUN is generated using the thin-provisioning function (i.e., the initial state), there is no chunk allocated a physical region. Upon receipt of a write request from the host computer 2, the volume controller 10 allocates a physical region contained in a pool region of the storage pool to a chunk related to the writing region of the request.

This consumes only a capacity inside the memory device equal to the capacity of data written from the host computer 2, making it possible to reduce waste of the storage capacity.

The method of providing a virtual volume to the host computer 2 by the volume controller 10 using the thin-provisioning function can be accomplished by any known method, so the detailed description the manner is omitted here.

As illustrated in FIG. 1, the volume controller 10 has functions as a releasable region decider 11, a determinator 12, a releaser 13, a chunk table manager 14, and a forecasting data outputter 15.

The chunk table manager 14 manages the chunk management table set 17. Namely, the volume controller 10 manages allocation of a physical region to a chunk using the chunk management table set 17.

Figure 3A:
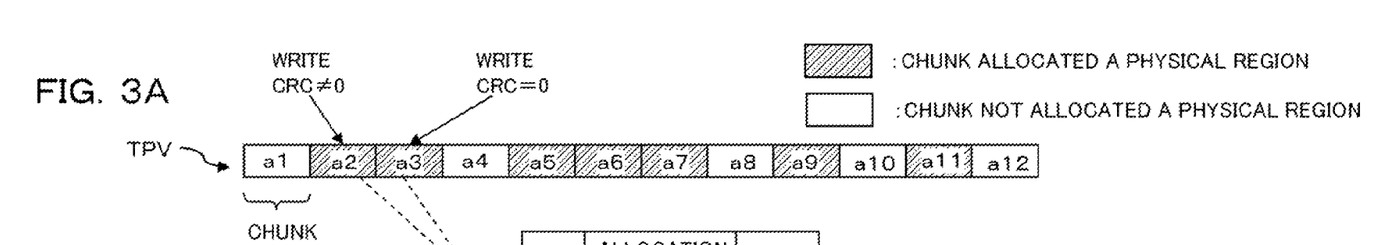
FIGS. 3A and 3B are diagrams illustrating a chunk management table of a virtual storage device of the first embodiment.
Figure 3B:
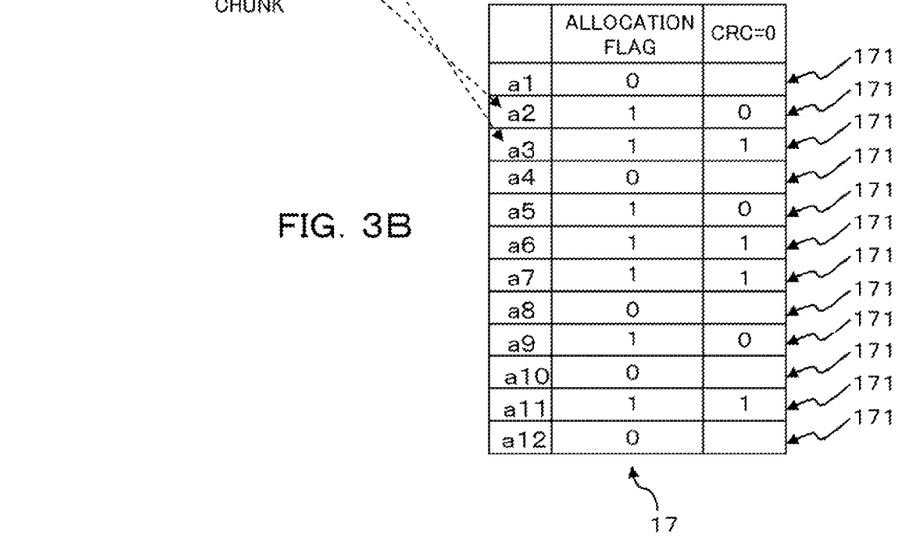

FIGS. 3A and 3B are diagrams illustrating the chunk management table set 17 of the virtual storage device 1 of the first embodiment. FIG. 3A is a diagram schematically illustrating a TPV; and FIG. 3B is a diagram illustrating chunk management tables corresponding to the TPV of FIG. 3A.

The chunk management table set 17 is an aggregation of the chunk management tables 171. A chunk management table 171 has information indicating a state of a chunk constituting a TPV and associate information (a1-a12) that identifies a chunk with an allocation flag as to whether a physical region is allocated to the corresponding chunk and a CRC zero flag (CRC=0).

The example of FIG. 3A illustrates a TPV containing 12 chunks represented by reference numbers a1-a12. Physical regions are allocated to the chunks a2, a3, a5-a7, a9, and a11 (i.e., Chunk allocated a physical region) of the TPV depicted in FIG. 3A while physical regions are not allocated to the chunks a1, a4, a8, a10, and a12 (i.e., Chunk not allocated a physical region) of the TPV.

FIG. 3B illustrates the chunk management table set 17 containing 12 chunk management tables 171 each associated with one of the chunks a1-a12 of FIG. 3A.

An allocation flag indicates whether a physical region is allocated to the corresponding chunk. For example, a chunk at least part of which is allocated a physical region has an allocation flag set to be "1" while a chunk which is not allocated a physical region has an allocation flag set to be "0".

In the chunk management tables 17 of FIG. 3B, "1" is set in the allocation flags of the chunks a2, a3, a5-a7, a9, and a11 and "0" is set in the allocation flags of the chunks a1, a4, a8, a10, and a12.

As the above, an allocation flag functions as allocation data representing a state of allocation of a physical region to each of the chunks (management unit regions) constituting the virtual logical volume.

A CRC zero flag indicates that the CRC of the data stored in the corresponding chunk is zero. Namely, when all the CRC values of the respective pieces of data received in units of LBAs from the host computer 2 are zero, the CRC zero flag is set to be "1". Specifically, when the logical sum (OR) of the CRC values of the respective pieces of data of one LBA unit stored in a chunk is 0, the CRC zero flag of the chunk is set to be "1". Hereinafter, setting "1" in a CRC zero flag is sometimes referred to as setting the flag "ON".

In contrast, when at least one of the CRC values of the respective pieces of data that are stored in a chunk and that are received in units of LBAs from the host computer 2 is not zero, the CRC zero flag of the chunk is set to be "0". Specifically, when the logical sum (OR) of the CRC values of the respective pieces of data stored in a chunk and received from the host computer 2 in units of LBAs is 1, the CRC zero flag of the chunk is set to be "0". Hereinafter, setting "1" in a CRC zero flag is sometimes referred to as setting the flag "OFF" or dropping the flag.

A CRC value of each piece of data of one LBA unit stored in a chunk is attached to the corresponding piece of data by the CA 101.

In the chunk management table set 171 of FIG. 3B, "1" is set in the CRC zero flags of the chunks a3, a6, a7, and a11, and "0" is set in the CRC zero flags of the chunks a2, a5, and a9.

As the above, a CRC zero flag functions as release candidate region data that indicates whether each of the chunks (management unit regions) constituting the virtual logical volume is a release candidate region.

The chunk management tables 171 (the chunk management table set 17) functions as management data that associates the allocation flag of each of the chunks constituting the virtual logical volume with the CRC flag of the same chunk.

The chunk table manager (updater) 14 updates a chunk management table 171 of a chunk storing write data received via the CA 101 on the basis of the result of the CRC on the write data.

For example, when the host computer 2 writes new data (of one LBA) into a TPV not allocated a physical disk region, the chunk table manager 14 updates the chunk management table set 17 in the following manner.

Specifically, the chunk table manager 14 sets the allocation flag of a chunk management table 171 corresponding to a chunk of the TPV, the chunk storing the written data, "ON". Further, when the CRC value of the written data is 0, the chunk table manager 14 sets the CRC flag of the chunk "ON".

In contrast, when the host computer 2 writes data (of one LBA) into a TPV already allocated a physical disk region, the chunk table manager 14 updates the chunk management table set 17 in the following manner.

Specifically, the chunk table manager 14 keeps the allocation flag of a chunk management table 171 corresponding to a chunk of the TPV, the chunk storing the written data, "ON".

The chunk table manager 14 updates the chunk management table set 17 of the region (chunk) written the data into on the basis of the state of a CRC zero flag and the CRC value of the written data in the following manner.

(1) when the CRC zero flag of the chunk into which the data is written is "1":

When the CRC zero flag of the chunk written the data into is "1", that is, when the CRC of the data stored in the allocated region is 0, and when the CRC of the written data is 0, the chunk table manager 14 does not change the CRC zero flag of the chunk management table 171 corresponding to the chunk. In other words, the CRC zero flag corresponding to the chunk is kept "1".

In contrast, when the CRC zero flag of the chunk written the data into is "1", that is, when the CRC of the data stored in the allocated region is 0, and when the CRC of the written data is not 0, the chunk table manager 14 drops the CRC zero flag of the chunk management table 171 corresponding to the chunk. In other words, the CRC zero flag corresponding to the chunk is set to be "0".

(2) when the CRC zero flag of the chunk into which the data is written is "0":

When the CRC zero flag of the chunk written the data into is "0", that is, when the CRC of the data stored in the allocated region is not 0, a chunk table manager 14 drops the CRC zero flag of the chunk management table 171 corresponding to the chunk regardless the CRC value of the written data (when being both zero or non zero). In other words, the CRC zero flag corresponding to the chunk is set to be "0". Checking CRC values in units of chunks, the first embodiment does not manage the LBA being accessed among the LBAs in the chunk, which makes it impossible to grasp which LBA in the corresponding chunk has a CRC value not being zero (i.e. CRC≠0).

Description will be made below in relation to the manner of updating a chunk management table 171 by the chunk table manager 14.

The releasable region decider 11 decides a releasable region with reference to the chunk management tables 171 (the chunk management table set 17).

First of all, the releasable region decider 11 decides that a chunk having an allocation flag and a CRC zero flag both set to be "1" in the chunk management table set 17 has a high possibility of being an all-zero region (zero-data region) all the data in which are zero (ALL zero). Hereinafter, a region having a high possibility of being an all-zero region (zero-data region) is referred to as a releasable region.

Zero data has a CRC being zero. Accordingly, when data has a CRC being zero, there is a possibility that the data is zero. Besides, data of all-zero region has a CRC being zero. The above means that a chunk having a CRC zero flag set to be "1" has a high possibility of storing all-zero. However, the relationship that "all-zero data has a CRC being zero" is always established whereas the relationship that "data having a CRC of zero is always all-zero data" is not always established.

The releasable region decider 11 manages the number of chunks that are decided to be releasable region using a releasable region counter, which is formed in the memory region 106 of the RAM 105. The releasable region decider 11 counts the number of chunks having an allocation flag and a CRC zero flag both set to be "1" on the chunk management table set 17 and stores the number into the releasable region counter.

The volume controller 10 further has a function (capacity monitoring function) of monitoring the capacity of the storage pool. This function detects a state of a ratio of the capacity of allocated physical volume to the capacity of the entire storage pool reaching a predetermined a threshold.

The determinator 12 determines whether each of the chunks that are decided to be releasable regions by the releasable region decider 11 is an all-zero region all the data in which are zero.

Specifically, the determinator 12 determines whether the respective data in a chunk decided to be a releasable region are 0-data one after another, that is, whether the data stored in the chunk is zero. Any known manner can be applied to the determination as to whether the respective data in a chunk are zero, so the detailed description is omitted here.

The releaser 13 releases allocation of a physical region to a chunk that is determined to be an all-zero region by the determinator 12. This means that the releaser 13 brings the physical region allocated to the chunk back to the storage pool.

The releaser 13 releases the physical region allocated to a chunk by, for example, autonomously carrying out the same process as that carried out when receiving a known allocation releasing command such as a UNMAP command or a WRITE SAME command from the host computer 2. Hereinafter, releasing of a physical region allocated to a chunk is sometimes referred to as releasing of allocation.

In addition, the releasable region decider 11 rewrites the allocation flag of the chunk in question from "1" to "0", so that the chunk is indicated to be in a state of not being allocated.

The releaser 13 may start the releasing of allocation in response to an instruction that an operator issues at a predetermined timing or may automatically start the releasing at the timing of detecting satisfaction of a predetermined condition.

The virtual storage device 1 of the first embodiment uses the following four conditions (i) through (iv) as a condition for automatically starting the releasing of allocation. The releasable region decider 11 starts the releasing of allocation at the timing of detecting satisfaction of at least one of these conditions.

(i) after the completion of copying by the copying function of the virtual storage device 1:

A block device, which generally reads and writes data in units of blocks having a certain size (e.g., 512 through 2048 bytes), carries out copying data in units of blocks.

For the above, when data in a certain LUN is copied into another LUN, the unused region of the source LUN is written to be zero-data into the destination volume. Therefore, there is a high possibility that the destination LUN after the copying has a zero-data region.

In the virtual storage device 1, releasing of allocation after the completion of copying of a LUN makes it possible to eliminate a zero-data generated by the copying, which is therefore efficient.

(ii) after completion of continuously writing LBAs into the entire region of a LUN:

In backing up a LUN, if the source LUN has an unused region, the unused region is backed up in the form of zero data into a destination LUN. Then the zero-data region is restored, the zero data is written into a LUN serving as the restoring destination to generate a zero-data region.

Restoring the entire LUN appears to the virtual storage device 1 as if sequential writing into the LUN is accomplished. Therefore, upon completion of sequential writing into the entire region of a LUN, the releaser 13 determines that restoring the entire region on the LUN is accomplished and thereby automatically carries out releasing of allocation. This can eliminate a zero-data region generated by restoring the entire region.

(iii) after initialization of a LUN from the host computer 2:

For example, the scheme of formatting a disk in the NTFS has a function of zero-clearing the entire region of the disk. When a LUN is initialized (disk formatting) using the function, the initialization appears to the virtual storage device 1 as if sequential writing into the LUN is accomplished, similarly to the above case (ii). Therefore, upon completion of sequential writing into the entire region of a LUN, the releaser 13 determines that restoring the entire region on the LUN is accomplished and thereby automatically carries out releasing of allocation. This can eliminate a zero-data region generated by restoring the entire region.

For the above, upon initialization of a LUM (i.e., generation of a file system or generation of a volume by a volume manager) from the host computer 2, the releaser 13 determines that restoring the entire region of the LUN is accomplished and automatically carries out releasing of allocation. This can eliminate a zero-data region generated by restoring the entire region.

(iv) when an alarm is issued during monitoring the capacity of a storage pool:

When the ratio of the capacity of an allocated physical region to the capacity of the entire storage pool reaches the predetermined threshold, the capacity monitoring function of the volume controller 10 described above issues an alarm and the releaser 13 starts releasing of the allocation.

Namely, when the available capacity of the storage pool comes to be small, releasing of the allocation brings the physical region allocated to a chunk back to the storage pool, so that the available capacity of the storage pool can be increased.

In the virtual storage device 1, allocation of zero-data to a LUN is a cause of reducing the available capacity. Accordingly, when the function of monitoring the capacity of the storage pool detects that the ratio of the capacity of the allocated physical region to the capacity of the entire storage pool reaches a predetermined threshold value, the releaser 13 carries out releasing of the allocation to release the zero-data region. Thereby, efficiency in using a storage pool can be enhanced.

Upon detection of at least one of the above conditions (i) through (iv), the releaser 13 determines that an allocation releasing instruction is issued and starts releasing of the allocation. Besides, upon input of an allocation releasing instruction by the operator using a non-illustrated inputting device, the releaser 13 starts releasing of the allocation.

The forecasting data outputter 15 outputs forecasting data containing data about a chunk that is decided to be a releasable region by the releasable region decider 11. For example, the forecasting data outputter 15 outputs (notifies) the capacity corresponds to the number of chunks that are decided to be releasable regions by the releasable region decider 11 to be the capacity expected to be releasable to, for example, a non-illustrated display.

Specifically, the forecasting data outputter 15 calculates the product of the number of chunks having an allocation flag and an CRC zero flag both set to be "1" and a size of a chunk to be an expected releasable capacity and notifies the calculated capacity. The notification of an expected releasable capacity is output onto, for example, a non-illustrated display. As described above, since the number of chunks having an allocation flag and an CRC zero flag both set to be "1" is stored into a releasable region counter by the releasable region decider 11, the forecasting data outputter 15 calculates the expected releasable capacity using the value stored in the releasable region counter.

The above manner makes the virtual storage device 1 possible to roughly forecast a capacity of releasable region only through checking on the memory, that is, without checking data on the physical disks.

The CPU 110 of each CM 100 executing a control program functions as the exclusive controller 20, the cache controller 22, the copy controller 23, the disk controller 24, and the volume controller 10 (the releasable region decider 11, the determinator 12, the releaser 13, the chunk table manager 14, and the forecasting data outputter 15).

The program (control program) to achieve the functions of the exclusive controller 20, the cache controller 22, the copy controller 23, the disk controller 24, and the volume controller 10 (the releasable region decider 11, the determinator 12, the releaser 13, the chunk table manager 14, and the forecasting data outputter 15) is provided in the form of being stored in a computer-readable re cording medium such as a flexible disk, a CD (e.g., CD-ROM, CD-R, CD-RW), and a DVD (e.g., DVD-ROM, DVD-RAM, DVD-R, DVD+R, DVD-RW, DVD+RW, HD DVD), a Blu-ray disk, a magnetic disk, an optical disk, and a magneto-optical disk. The computer reads the program from the recording medium and stores the program into an internal or external memory for future use. The program may be stored in a storage device (recording medium), such as a magnetic disk, an optical disk, and a magneto-optical disk, and may be provided to a computer from the storage device through a communication route.

The functions of the exclusive controller 20, the cache controller 22, the copy controller 23, the disk controller 24, and the volume controller 10 (the releasable region decider 11, the determinator 12, the releaser 13, the chunk table manager 14, and the forecasting data outputter 15) are achieved by a microprocessor (corresponding to the CPU 110 of the first embodiment) executing a program stored in an internal memory (corresponding to the RAM 105 or the ROM 103 of each CM 100 in the first embodiment). Alternatively, a computer may read a program stored in a recording medium and execute the read program.

Here, a computer is a concept of a combination of hardware and an Operating System (OS), and means hardware which operates under control of the OS. Otherwise, if a program operates hardware independently of an OS, the hardware corresponds to the computer. Hardware includes at least a microprocessor such as a CPU and means to read a computer program recorded in a recording medium. In the first embodiment, the CMs 110 serve to function as a computer.

Figure 4:
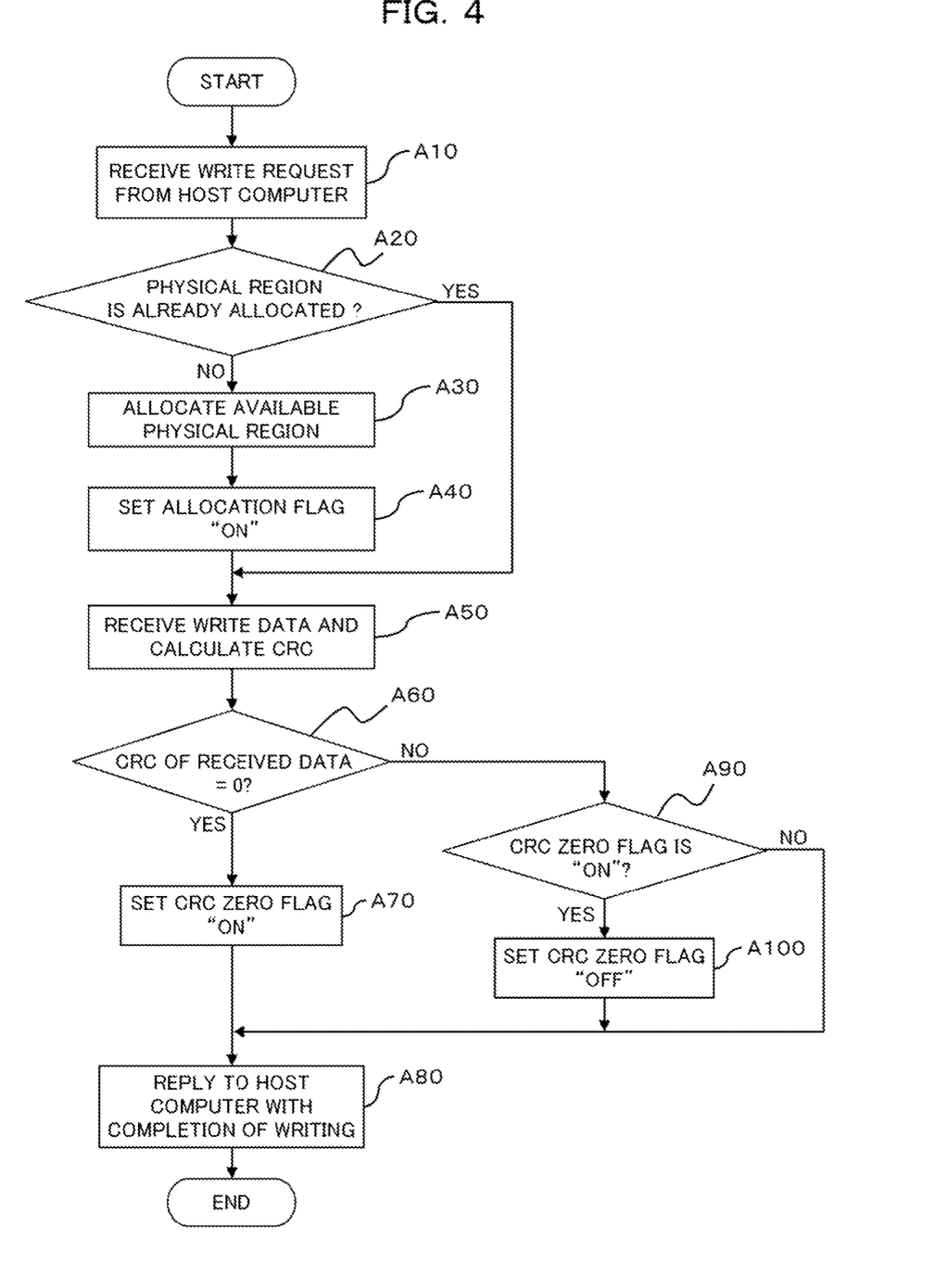
FIG. 4 is a flow diagram denoting a succession of procedural steps of data writing in a virtual storage device of the first embodiment.

Description will now be made in relation to a succession of procedural steps performed when data writing in the virtual storage device 1 with reference to a flow diagram (steps A10-A100) of FIG. 4.

First of all, the virtual storage device 1 receives a write request from the host computer 2 (step A10).

In response to the wiring request, the volume controller 10 determines, with reference to an allocation flag on the chunk management table 171, whether the chunk (write-destination chunk) of a TVP of the write destination is allocated a physical region (step A20).

If a physical region is not allocated to the write-destination chunk (NO route in step A20), a physical region from the storage pool is allocated to the write-destination chunk (step A30). The chunk table manager 14 sets the allocation flag of the write-destination chunk in the chunk management table 171 ON (step A40).

After that, the virtual storage device 1 receives the write data, and CA 101 carries out CRC on the received write data in units of LBAs and attaches the result of the CRC to the write data (step A50). Then the cache controller 22 stores the received data into the cache region 107.

In contrast, if a physical region is already allocated to a write-destination chunk (YES route in step A20), the procedure moves to step A50.

The chunk table manager 14 confirms whether the CRC of the received write data is zero (step A60). If the CRC of the received write data is zero (YES route in step A60), the chunk table manager 14 set the CRC zero flag on the chunk management table 171 of a chunk (write-destination flag) into which the to-be-written data is to be stored ON (step A70). Then the volume controller 10 replies to the host computer 2 with completion of writing (step A80) and finishes the procedure.

On the other hand, if the CRC of the received write data is not zero (NO route in step A60), the chunk table manager 14 confirms the CRC zero flag on the chunk management table 171 of the write-destination chunk (step A90). Namely, the chunk table manager 14 checks whether the CRC zero flag of the write-destination chunk is ON. If the CRC zero flag of the write-destination chunk is ON (YES route in step A90), the chunk table manager 14 sets the CRC zero flag on the chunk management table 171 of the write-destination chunk (step A100) and the procedure moves to step A80.

Further, if the CRC zero flag is not ON (NO route in step A90), no change is made, that is, the CRC zero flag on the chunk management table 171 of the write-destination chunk is kept OFF, and the procedure moves to step A80.

Figure 5:
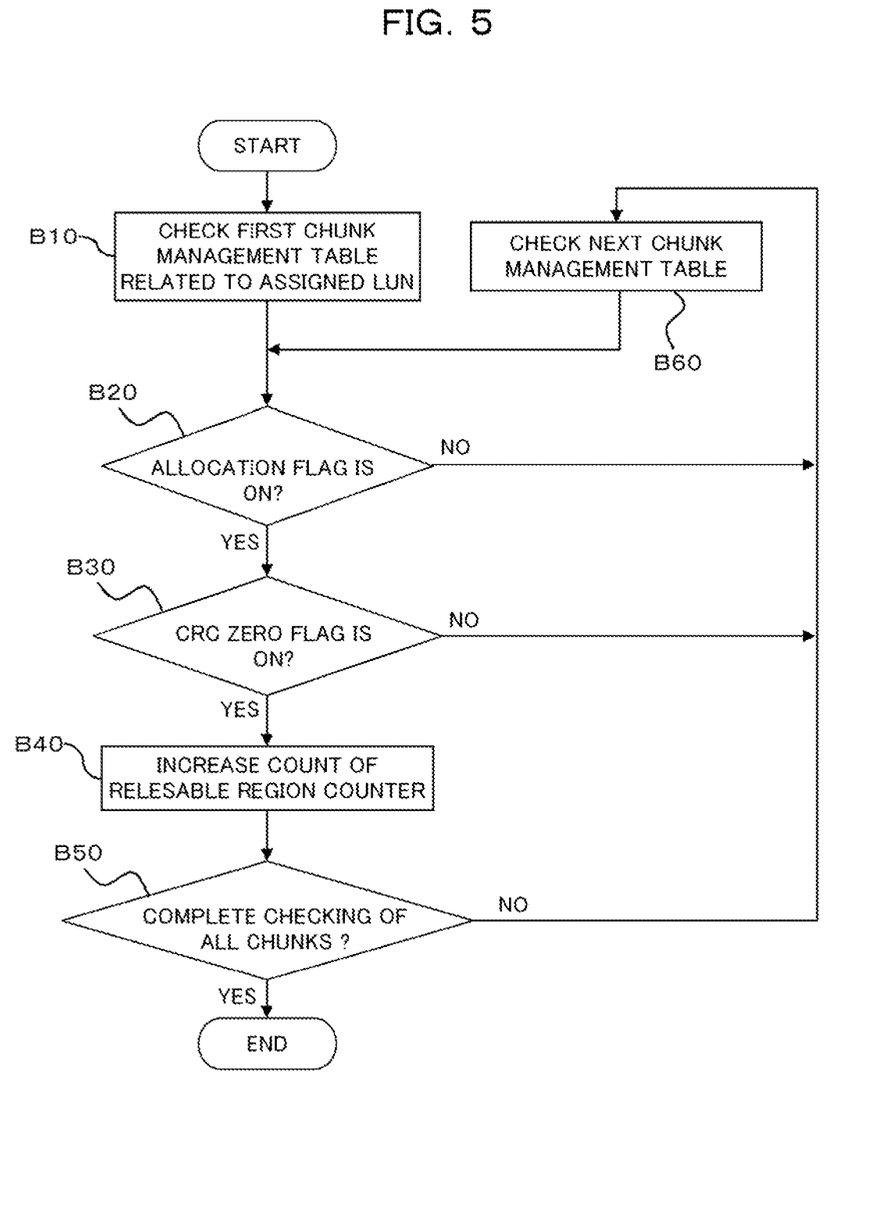
FIG. 5 is a flow diagram denoting a succession of procedural steps of deciding a releasable region by a releasable region decider of a virtual storage device of the first embodiment.

Next, description will now be made in relation to a succession of procedural steps of deciding of a releasable region by the releasable region decider 11 of the virtual storage device 1 of the first embodiment with reference to a flow diagram (steps B10-B60) of FIG. 5.

The forecasting of releasing allocation starts when the operator, who wishes to confirm the capacity of releasable physical region in the virtual storage device 1, issues an instruction along with assigning a LUN being a TPV to be released.

The releasable region decider 11 confirms a chunk on the first chunk management table 171 of the chunk management table set 17 related to the assigned LUN to be an object chunk to be checked (step B10).

The releasable region decider 11 confirms whether the allocation flag of the object chunk is set to be ON with reference to the chunk management table 171 (step B20). If the allocation flag of the object chunk is not ON (NO route in step B20), the releasable region decider 11 determines that the chunk on the next chunk management table 171 in the chunk management table set 17 to be an object chunk to be checked (step B60) and returns the procedure to step B20.

If the allocation flag of the object chunk is ON (YES route in step B20), the releasable region decider 11 then confirms whether the CRC zero flag is ON with reference to the chunk management table 171 of the object chunk (step B30). If the CRC zero flag of the object chunk is not ON (NO route in step B30), the procedure moves to step B60.

If the CRC zero flag of the object chunk is ON (YES route in step B30), the releasable region decider 11 increases the count of the releasable region counter in increments of one (step B40). After that, the releasable region decider 11 confirms whether checking of all the chunks in the chunk management table set 17 is completed (step B50). If checking of all the chunks is not completed (NO route in step B50), the procedure moves to step B60.

If checking of all the chunks is completed (YES route in step B50), the releasable region decider 11 terminates the procedure of deciding a releasable region.

The forecasting data outputter 15 calculates an expected releasable capacity using the count of the releasable region counter calculated by the releasable region decider 11 in step B40, and outputs the expected releasable capacity thus calculated to a display or other device.

This makes the operator to easily grasp the capacity of a physical region expected to be releasable, and is therefore convenient.

Figure 6:
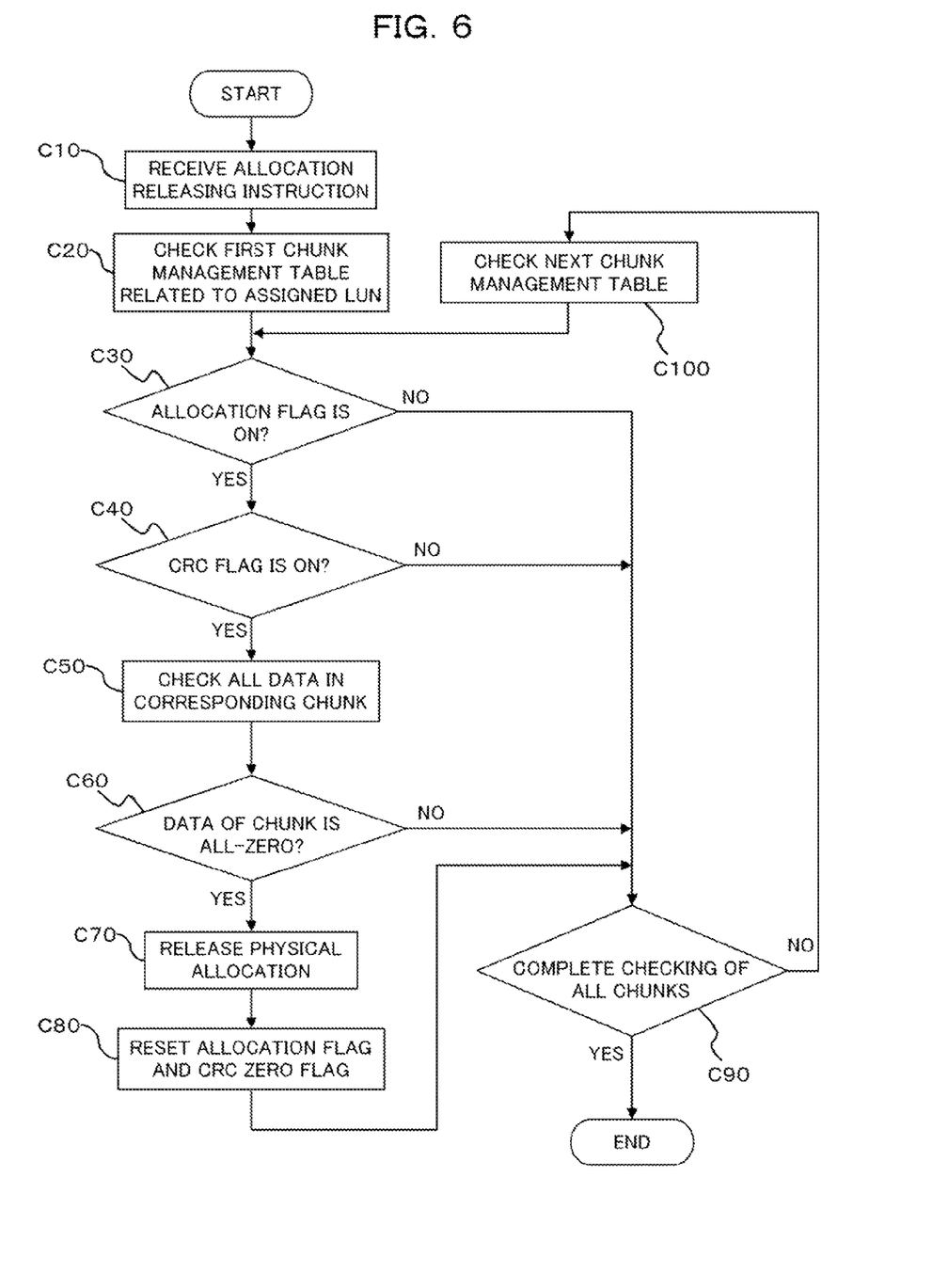
FIG. 6 is a flow diagram denoting a succession of procedural steps of releasing allocation in response to reception of an allocation releasing instruction in a virtual storage device of the first embodiment.

Next, description will now be made in relation to a succession of procedural steps of releasing allocation performed when an allocation releasing instruction is received in the virtual storage device 1 of the first embodiment with reference to a flow diagram (steps C10-C100) of FIG. 6.

For example, upon receipt of an allocation releasing instruction (step C10) under a state where at least one of the above four conditions is satisfied, the releasable region decider 11 confirms a chunk on the first chunk management table 171 of the chunk management table set 17 related to the assigned LUN to be an object chunk to be checked (step C20).

The releasable region decider 11 confirms whether the allocation flag of the object chunk is set to be ON in the chunk management table 171 of the object chunk (step C30). If the allocation flag of the object chunk is not ON (NO route in step C30), the releasable region decider 11 confirms whether checking of all the chunks in the chunk management table set 17 is completed (step C90).

If checking of all the chunks is completed (YES route in step C90), the releasable region decider 11 terminates the procedure of deciding a releasable region. Conversely, if checking of all the chunks is not completed (NO route in step C90), the chunk of the next chunk management table 171 of the chunk management table set 17 is set to be an object chunk (step C100), and the procedure returns to step C30.

If the allocation flag of the object chunk is ON (YES route in step C30), the releasable region decider 11 then confirms whether the CRC zero flag is ON with reference to the chunk management table 171 of the object chunk (step C40). If the CRC zero flag of the object chunk is not ON (NO route in step C40), the procedure moves to step C90.

If the CRC zero flag of the object chunk is ON (YES route in step C40), the determinator 12 checks all the data in the object chunk (step C50). Specifically, the determinator 12 determines whether all the data in the object chunk is zero, that is, whether data in the object chunk is all-zero data (step C60). If the object chunk is not all-zero data (NO route in step C60), the procedure moves to step C90.

If the object chunk is all-zero data (YES route in step C60), the physical region allocated to the object chunk is released (step C70). In succession, the allocation flag of the object chunk is reset to "0" in the corresponding chunk management table 171 (step C80), and the procedure moves to step C90.

According to the virtual storage device 1 of the first embodiment, the releasable region decider 11 decides that a chunk that has an allocation flag and a CRC zero flag both set to be "1" in the corresponding chunk management table 171 is a region (releasable region) having a high possibility of being an all-zero region all data in which are zero. Then, the determinator 12 decides whether a chunk decided to be a releasable region by the releasable region decider 11 is an all-zero region (ALL0) all the data in which are zero.

This eliminates the requirement of the determinator 12 to determine as to whether all the chunks in the TPV are each all-zero data, so that releasing of all-zero data can be accomplished rapidly. In addition, this can reduce the load on the CM 100 and the CPU 110.

This virtual storage device 1 utilizes the characteristics of CRC that, when CRC on data is zero, there is a possibility that the data is zero, and uses a CRC value that is attached to data forwarded from the host computer 2 and that are used for ensuring data consistency by the CA 101. The control of the first embodiment can be accomplished by the CRC function already existing, which gene rates no additional overhead. Namely, this control can be introduced into the virtual storage device 1 at a low cost.

Furthermore, the forecasting data outputter 15 forecasts an expected releasable capacity corresponding to the number of chunks determined to be releasable regions by the releasable region decider 11, and notifies the capacity. This makes it possible to grasp the capacity that can be secured by releasing allocation of all-zero regions in advance, enhancing the convenience.

Allocation of a physical region is carried out at one of the timings of: (i) after the completion of copying by the copying function of the virtual storage device 1; (ii) after completion of continuously writing LBAs into the entire region of a LUN; (iii) after initialization of a LUN from the host computer 2; and (iv) when an alarm is issued in monitoring the capacity of a storage pool. Thereby, a physical region can be efficiently released.

The volume controller 10 provides the host computer 2 with a virtual volume of a thin-provisioning type. With this configuration, when the using rate of the LUN rises, a memory device is added to the device enclosure 30 without stopping the operation of the virtual storage device 1. This makes it possible to increase the capacity of physical disks without affecting the OS. Specifically, the virtual storage device 1 starts its operation using least physical disk, and in accordance with increase in using rate of the LUN, another physical disk is added. This operation manner can run the virtual storage device 1 at a low cost and at the same time, the using rate of physical disks can be increased.

The technique disclosed above can increase the speed of releasing an all-zero region.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A virtual storage device that provides a superordinate device with a virtual logical volume including a plurality of management unit regions, the virtual storage device comprising:
   a releasable region decider that decides whether each of the plurality of management unit regions is a releasable region, being allocated a physical region and being a release candidate region, by referring to management data that associates allocation data representing a state of allocating a physical region to the management unit region and release candidate region data representing whether the management unit region is a release candidate region with each of the other of the plurality of management unit regions;
   a determinator that determines whether the management unit region, decided to be the releasable region by the releasable region decider, is an all-zero region having all data in which are zero; and
   a releaser that releases allocation of a physical region allocated to the management unit region determined to be the all-zero region by the determinator.

2. The virtual storage device according to claim 1, further comprising a forecasting data outputter that outputs forecasting data about the management unit region decided to be the releasable region by the releasable region decider.

3. The virtual storage device according to claim 1, wherein when the result of a cyclic redundancy check on data in the management unit region is zero, the release candidate region data included in the management data indicates that the management unit region is a release candidate region.

4. The virtual storage device according to claim 1, further comprising:
   a checker that carries out a cyclic redundancy check on to-be-written data received from the superodinate device; and
   an updater that updates the management data of a management unit region related to the to-be-written data on the basis of the result of the cyclic redundancy check by the checker.

5. The virtual storage device according to claim 1, wherein upon detecting of data copying to the virtual logical volume,
   the releasable region decider makes the decision as to whether the management unit region is a releasable region;
   the determinator makes the determination as to whether the management unit region is an all-zero region; and
   the releaser releases the allocation of a physical region to the management unit region.

6. The virtual storage device according to claim 1, wherein upon detecting of continuous data writing into the entire region of the virtual logical volume,
   the releasable region decider makes the decision as to whether the management unit region is a releasable region;
   the determinator makes the determination as to whether the management unit region is an all-zero region; and
   the releaser releases the allocation of a physical region to the management unit region.

7. The virtual storage device according to claim 1, wherein upon detecting of an available capacity of a storage pool that manages a physical storage resource defining the virtual logical volume being a predetermined value or less,
   the releasable region decider makes the decision as to whether the management unit region is a releasable region;
   the determinator makes the determination as to whether the management unit region is an all-zero region; and
   the releaser releases the allocation of a physical region to the management unit region.

8. A controller comprising:
   a releasable region decider that decides whether each of a plurality of management unit regions included in a virtual logical volume is a releasable region, being allocated a physical region and being a release candidate region, by referring to management data that associates allocation data representing a state of allocating a physical region to the management unit region and release candidate region data representing whether the management unit region is a release candidate region with each of the other of the plurality of management unit regions;
   a determinator that determines whether the management unit region, decided to be the releasable region by the releasable region decider, is the all-zero region having all data in which are zero; and
   a releaser that releases allocation of a physical region allocated to the management unit region determined to be the all-zero region by the determinator.

9. The controller according to claim 8, further comprising a forecasting data outputter that outputs forecasting data about the management unit region decided to be the releasable region by the releasable region decider.

10. The controller according to claim 8, wherein when the result of a cyclic redundancy check on data in the management unit region is zero, the release candidate region data included in the management data indicates that the management unit region is a release candidate region.

11. The controller according to claim 8, further comprising:

a checker that carries out a cyclic redundancy check on to-be-written data received from a superodinate device; and an updater that updates the management data of a management unit region related to the to-be-written data on the basis of the result of the cyclic redundancy check by the checker.

12. The controller according to claim 8, wherein upon detecting of data copying to the virtual logical volume, the releasable region decider makes the decision as to whether the management unit region is a releasable region;

the determinator makes the determination as to whether the management unit region is an all-zero region; and the releaser releases the allocation of a physical region to the management unit region.

13. The controller according to claim 8, wherein upon detecting of continuous data writing into the entire region of the virtual logical volume, the releasable region decider makes the decision as to whether the management unit region is a releasable region;

the determinator makes the determination as to whether the management unit region is an all-zero region; and the releaser releases the allocation of a physical region to the management unit region.

14. The controller according to claim 8, wherein upon detecting of an available capacity of a storage pool that manages a physical storage resource defining the virtual logical volume being a predetermined value or less, the releasable region decider makes the decision as to whether the management unit region is a releasable region;

the determinator makes the determination as to whether the management unit region is an all-zero region; and the releaser releases the allocation of a physical region to the management unit region.

15. A computer-readable recording medium having stored therein a control program for causing a computer to execute a process comprising:

deciding whether each of a plurality of management unit regions included in a virtual logical volume is a releasable region, being allocated a physical region and being a release candidate region, by referring to management data that associates allocation data representing a state of allocating a physical region to the management unit region and release candidate region data representing whether the management unit region is a release candidate region with each of the other of the plurality of management unit regions;

determining whether the management unit region, decided to be the releasable region in the deciding, is an all-zero region having all data in which are zero; and releasing the physical region allocated to the management unit region determined to be an all-zero region in the determining.

16. The computer-readable recording medium according to claim 15, the process further comprising outputting forecasting data about the management unit region decided to be a releasable region in the deciding.

17. The computer-readable recording medium according to claim 15, wherein when the result of a cyclic redundancy check on data in the management unit region is zero, the release candidate region data included in the management data indicates that the management unit region is a release candidate region.

18. The computer-readable recording medium according to claim 15, the process further comprising updating the management data of a management unit region related to the to-be-written data received from a superodinate device on the basis of the result of a cyclic redundancy check carried out on the to-be-written data.

19. The computer-readable recording medium according to claim 15, the process further comprising:

upon detecting of data copying to the virtual logical volume, making the decision as to whether he management unit region is a releasable region;

determining whether the releasable region decided in the deciding decided to be the releasable region in the deciding is an all-zero region; and releasing the allocation of a physical region to the management unit region determined to be an all-zero region in the determining.

20. The computer-readable recording medium according to claim 15, the process further comprising:

upon detecting of continuous data writing into the entire region of the virtual logical volume making the decision as to whether he management unit region is a releasable region;

determining whether the releasable region decided in the deciding decided to be the releasable region in the deciding is an all-zero region; and releasing the allocation of a physical region to the management unit region determined to be an all-zero region in the determining.

* * * * *